United States Patent [19]

Dong et al.

[11] Patent Number: 4,462,054

[45] Date of Patent: Jul. 24, 1984

[54] DISC DRIVE ELECTROMAGNETIC ACTUATOR WITH ENHANCED FLUX DENSITY

[75] Inventors: Charles W. Dong, San Jose; Michel Barrat, Menlo Park, both of Calif.

[73] Assignee: Sperry Corporation, New York, N.Y.

[21] Appl. No.: 379,599

[22] Filed: May 19, 1982

[51] Int. Cl.³ .......................... G11B 5/54; G11B 21/08
[52] U.S. Cl. .................................... 360/106; 360/105; 310/12
[58] Field of Search ............... 360/106, 104, 105, 109, 360/75, 129, 137, 97–99; 310/12, 27

[56] References Cited

U.S. PATENT DOCUMENTS

| | | | |
|---|---|---|---|
| 4,006,372 | 2/1977 | Brown, Jr. et al. | 310/13 |
| 4,305,105 | 12/1981 | Ho et al. | 360/106 |
| 4,331,991 | 5/1982 | Morehouse et al. | 360/106 |
| 4,393,425 | 7/1983 | Wright | 360/106 X |

OTHER PUBLICATIONS

IBM/TDB, vol. 12, No. 12, May 1970, p. 2273, "High Force Constant Voice Coil Motor for Rapid Seek" by Rexford.

*Primary Examiner*—John H. Wolff
*Attorney, Agent, or Firm*—Thomas H. Olson; Eugene T. Battjer

[57] ABSTRACT

An electromagnetic actuator for a data disc drive having a carriage on which is mounted one or more read/write heads for cooperation with a data disc. The carriage is supported in the housing for movement on an axis that is oriented radially of the disc. The end of the carriage remote from the read/write head is of hollow rectangular cross-sectional shape; there is a voice coil mounted on the end of the carriage. A magnetic housing defines a cavity in alignment with the carriage and the coil so that the carriage and coil can move within the cavity. The housing is constructed of magnetic material, and in magnetic circuit with the housing is at least one permanent magnet. The permanent magnet has a surface that confronts the path along which the coil moves. Between the permanent magnet surface and the coil is a flux focussing pole piece of generally trapezoidal shape so that the flux density at the inner surface of the pole piece that confronts the path of coil movement is greater than the flux density at the inner surface of the permanent magnet. Consequently, for a given current flow within the coil, a great force is applied to the carriage so that faster radial movement of the carriage and the read/write head can be achieved.

5 Claims, 5 Drawing Figures

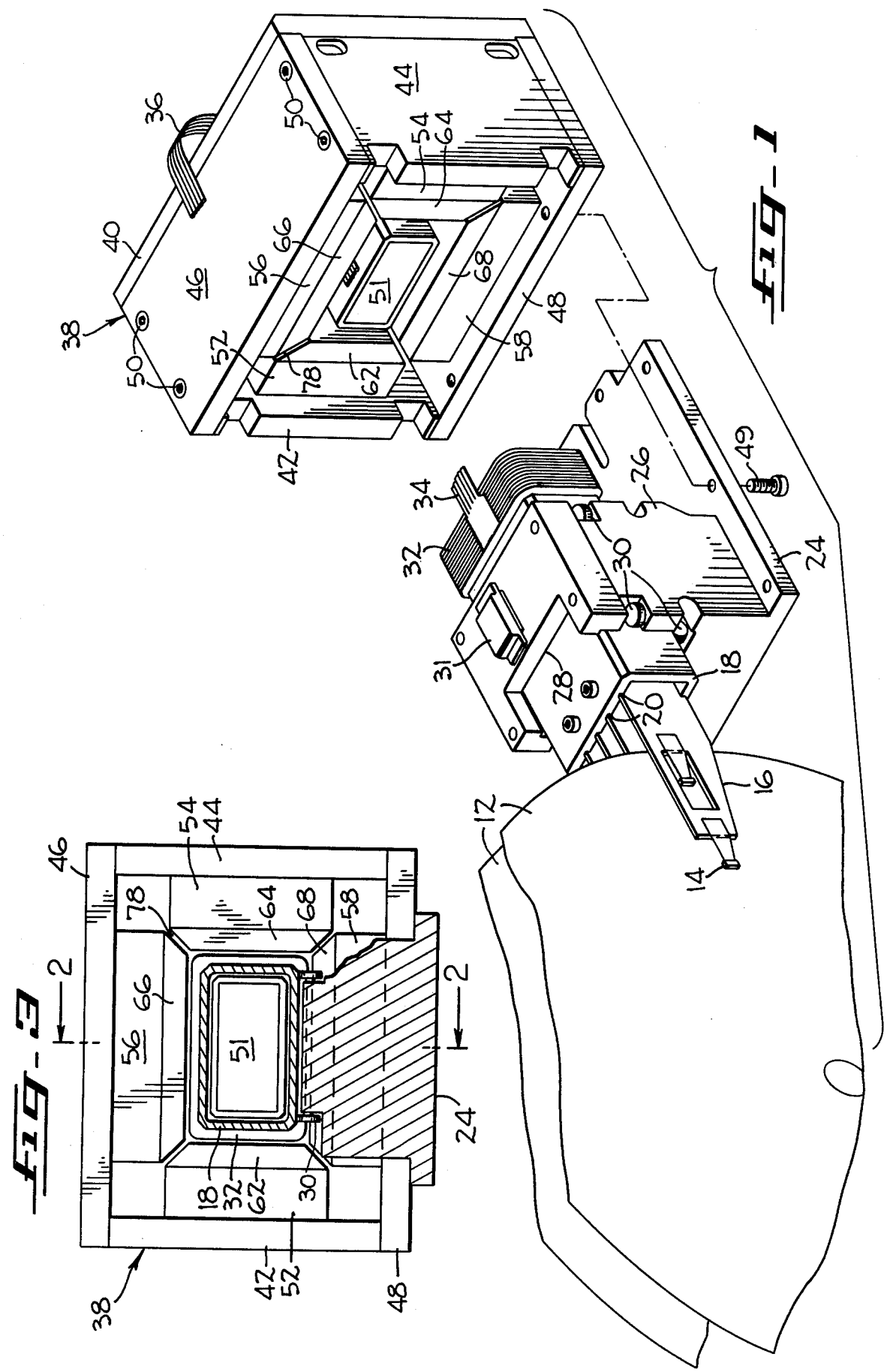

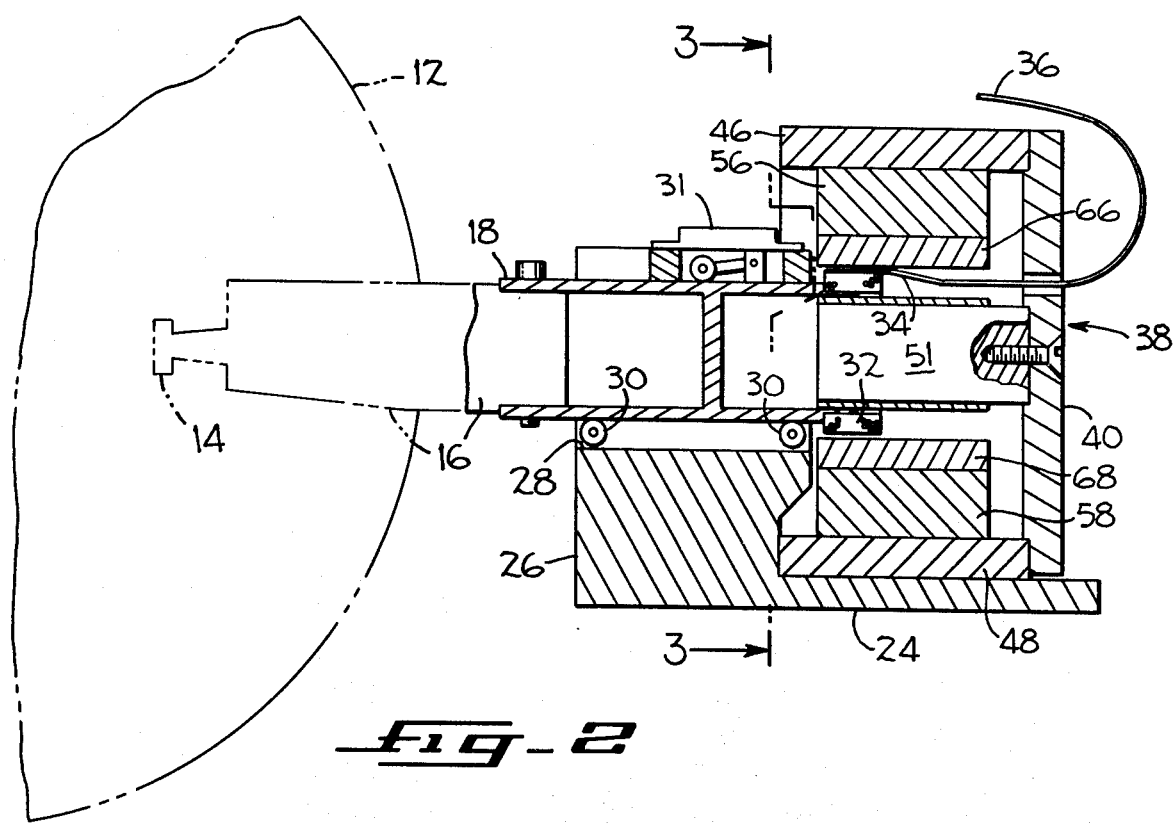
fig_2
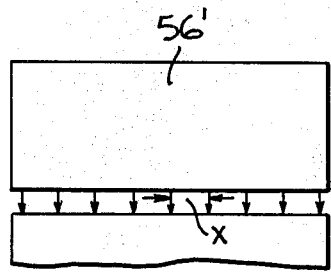
fig_4A
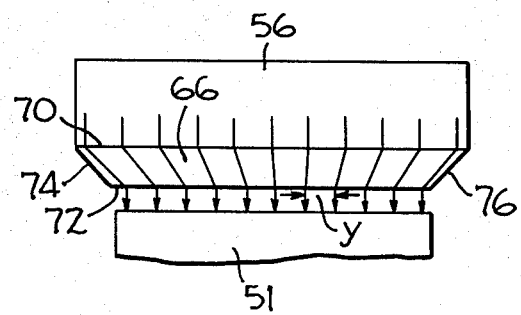
fig_4B

DISC DRIVE ELECTROMAGNETIC ACTUATOR WITH ENHANCED FLUX DENSITY

BACKGROUND OF THE INVENTION

1. Field of the Invention

This invention relates to an electromagnetic actuator for a disc drive and more particularly to a magnetic core configuration which produces enhanced flux density and increased force.

2. Description of the Prior Art

A typical electromagnetic actuator for disc drive includes a fixed core having a working gap in which a magnetic flux field is produced by one or more permanent magnets. A carriage that supports a read/write head for cooperation with a magnetic data disc carries an electromagnetic coil and is arranged for operation within the working gap in the core. Application of current of proper magnitude and polarity to the coil produces a magnetic field which reacts with the magnetic field in the working gap to apply force to the carriage in a direction radially of the disc. Such force causes movement of the carriage and the read/write head. Rapid movement of the carriage and read/write head is desirable in order to minimize the time required to access data on a given portion of a disc. Greater force on the carriage reduces the time required for the carriage to be moved and greater flux density in the core working gap produces a greater force.

U.S. Pat. No. 4,305,105 discloses a linear actuator for a magnetic disc drive that has a plurality of iron fingers of arcuate shape which fit into correspondingly shaped slots on a movable bobbin. The bobbin has a voice coil which produces magnetic flux that cooperates with magnetic flux produced by permanent magnets associated with the fingers.

U.S. Pat. No. 4,287,445 discloses a high performance disc drive actuator having a hollow rectangular carriage and a fixed magnetic core that defines a channel shaped to receive the hollow rectangular carriage, there being a voice coil on the carriage and permanent magnets in the housing to produce a flux field within the channel.

SUMMARY OF THE INVENTION

According to the present invention there is a housing formed of ferrous material; the housing defines a rectangular cavity. Adhesively joined to the four walls that define the rectangular cavity are four permanent magnets, the permanent magnets are preferably ceramic magnets which are widely available at relatively low cost. The magnets have inner surfaces which define a rectangular cavity of smaller cross-sectional size than the cavity formed by the housing. Adhesively joined to the inner surfaces of the respective permanent magnets are flux focussing pole pieces that are formed of iron, steel or like material having good magnetic properties. The flux focussing pole pieces have outer surfaces that are substantially congruent to the inner surfaces of the permanent magnets and are adhesively joined to the inner magnet surfaces. The inner surfaces of the flux focussing pole pieces are of smaller area and define a rectangular cavity centrally of which is supported a rectangular central pole piece, the surfaces of which confront the inner surfaces of the focussing pole pieces across a working gap. The carrier is disposed in the working gap for movement relative to the housing. The focussing pole pieces have a generally trapezoidal cross-sectional shape so that the area of the inner surface of the focussing pole pieces is less than the area in contact with the permanent magnets. Accordingly, the flux density at the inner surfaces and within the working gap is greater than the flux density produced by the permanent magnets. Such increased flux density results in application of greater force on the carriage and consequent reduction of access time to the data on the disc with which the actuator is employed.

An object of the invention is to provide an electromagnetic actuator for a disc drive which combines relatively low cost with fast access time. This object is achieved because ceramic magnets, which are relatively inexpensive but which produce relatively small flux densities, are employed, and the flux density is increased or enhanced by focussing pole pieces constructed and installed in accordance with the invention.

Another object of the invention is to provide an electromagnetic actuator for a disc drive which can be fabricated without employing highly sophisticated fabrication or machine procedures. This object is achieved in accordance with the present invention because the housing is fabricated of plate stock and because the focussing pole pieces are of general trapezoidal shape.

A further object of the invention is to provide an increased flux density and corresponding decreased disc access time without employment of relatively expensive permanent magnetic materials and without imposing unduly stringent tolerances on the part of the device.

The foregoing, together with other objects, features and advantages will be more apparent after referring to the following specifications and accompanying drawings.

BRIEF DESCRIPTION OF THE DRAWINGS

FIG. 1 is an exploded perspective view of a disc drive actuator embodying the invention.

FIG. 2 is a cross-sectional view of an actuator in the operating position taken substantially along the plane indicated by line 2—2 of FIG. 1.

FIG. 3 is a sectional view taken along line 3—3 of FIG. 2.

FIG. 4A is a partially diagramatic view depicting a flux field as produced in prior art devices.

FIG. 4B is a view similar to FIG. 4A showing the flux field produced in accordance with the present invention.

DESCRIPTION OF THE PREFERRED EMBODIMENT

Referring more particularly to the drawing reference numeral 12 indicates individual magnetic data discs of known form which are supported on and driven by a spindle (not shown) which in this case is supported for rotation on a horizontal axis. Although FIG. 1 shows two discs 12, the invention can be incorporated in disc drive systems employing any number of data discs. A read/write head 14 is provided for cooperation with the magnetic material on disc 12 for writing data onto the disc and reading data from the disc. The radial position of head 14 determines the track on disc 12 which is accessed by the head.

The head is carried at the outer end of the head support plate 16, the inner end of which is mounted to a carriage 18. Carriage 18 is generally rectangular shaped and defines a rectangular opening which is slotted as at 20 to rigidly secure support plate 16 to the carriage. As can be seen in FIG. 1, there is a plurality of slots 20 so that the device can accommodate a plurality of support plates and read/write heads.

A base 24 is mounted rigid with the frame (not shown) on which the spindle that carries disc 12 is mounted. Base 24 has an upstanding portion 26 which defines a rectangular opening 28. Rectangular opening 28 is sized and shaped to support carriage 18 for axially reciprocating movement therein. There are roller bearings 30 for maintaining carriage 18 in alignment and to afford free movement thereof, one or more of the bearings optionally being preload bearings supported by a bearing support 31.

The inner end of carriage 18 has rigidly mounted thereto a voice coil or electric coil 32. As seen most clearly in FIG. 2 the inner end of carriage 18 is externally rabbetted to effect secure mounting to the coil to the carriage. The outer cross-sectional shape of the coil is rectangular so that the coil is substantially congruent to the carriage. A flexible flat conductor 34 is connected to the coil for supplying power thereto, the conductor having an external loop shown at 36 in FIG. 2 to afford connection to a suitable termination to which a current supply conductor (not shown) is typically connected.

Secured to base 24 is a housing 38 which has a generally boxed shaped configuration. There is a back plate 40, side plates 42 and 44, a top plate 46 and a bottom plate 48. Bottom plate 48 and base 24 have registering holes so that mounting screws, such as indicated at 49, can be employed to mount the housing to the base.

The plate members that form housing 38 are constructed of iron, steel, or like magnetic material having low reluctance. As seen most clearly in FIG. 1, side plates 42 and 44, top plate 46 and bottom plate 48 are retained in assembled relation by screws 50 to define a rectangular cavity. Centrally of the cavity is a central core piece 51 which is fastened to the inner surface of back plate 40 and extends horizontally of the cavity. The outer shape of the central core piece is such as to fit within coil 32 and carriage 20. Mounted within the cavity are four permanent magnets, namely: a magnet 52 adhesively secured to the interior surface of side wall 42, a permanent magnet 54 adhesively secured to the inner surface of side wall 44, a permanent magnet 56 adhesively secured to the inner surface of top plate 46 and a permanent magnet 58 adhesively secured to the inner surface of bottom plate 48. The permanent magnets are of right parallelepiped shape and have inner surfaces that are substantially parallel to respective external surfaces of central core piece 51.

There are focussing pole pieces 62, 64, 66 and 68 which have faces adhesively secured to the inner faces of permanent magnets 52-58, respectively. As can be seen in FIG. 3, the focussing pole pieces are of trapezoidal cross-sectional shape. Referring to FIG. 4B, in which permanent magnet 56 and focussing pole piece 66 are shown as exemplars, each focussing pole piece includes an outer surface 70 which is substantially congruent to the inner surface of the permanent magnet to which the focussing pole piece is adhesively secured, an inner surface 72 which confronts central pole piece 51 across a working gap in which coil 32 moves, and side surfaces 74 and 76 which are tapered so as to converge from the outer surface to the inner surface. The inner surfaces of all four focussing pole pieces define with the confronting outer surfaces of central pole piece 51 a working gap in which coil 32 moves. The working gap has an annular shape, the term annular for the purposes of the present specification and claims meaning a gap that is continuous and is of generally rectangular or equivalent shape.

Comparison of FIGS. 4A and 4B illustrates the flux enhancement achieved in accordance with the invention. In FIG. 4A, a permanent magnet 56' produces a flux field the magnitude of which is represented by a space x between adjacent lines that schematically represent the flux field. The strength of the flux field is inversely proportional to x so that a smaller x would indicate a more powerful magnet. Even the best available ceramic magnets have a limited flux density, i.e. a limited minimum value of x.

Magnet 56 seen in FIG. 4B has the same flux density as magnet 56'. Because the surface area of magnet 56 is greater than that of magnet 56', however, the former magnet produces more total flux, but at the same density. The presence of focussing pole piece 66 increases the flux density at the working gap, such increased density being schematically represented in FIG. 4B by a spacing y between adjacent lines representing flux, y being less than x and therefore the flux density in the working gap being greater.

Side surfaces 74 and 76 of the focusing pole pieces preferably lie at a 45° angle in order to facilitate assembly of the device and in order to facilitate machining procedures in fabricating the focussing pole pieces. This results, as can be seen in FIG. 3, in the formation of air gaps 78 where side surfaces of adjacent focussing pole pieces confront one another. The air gaps exist at the corners of the annular gap and extend at 45° with respect to the principal surfaces of the focussing pole pieces. The air gaps reduce interaction between the flux fields produced by adjacent magnets and thus enhance the flux density within the working gap.

Fabrication of a drive system in accordance with the invention is straightforward and uncomplex. Housing 38 is constructed of flat plate material which can be formed and assembled expeditiously. Permanent magnets 52-58 have a right parallelepiped configuration so as to eliminate sophisticated machining procedures. After the permanent magnets are properly sized, they need only be adhesively secured to the side plates of the housing by commercially available adhesive that assures firm attachment and a low reluctance attachment. Because focussing pole pieces 62-68 are formed of relatively soft magnetic steel, the machining procedures to form the pole pieces with a trapezoidal cross-sectional shape can proceed with conventional machining techniques. The focussing pole pieces are adhesively secured to the respective faces of the permanent magnet to achieve the configuration shown in FIG. 2. Thus the working gap in which coil 32 moves has enhanced flux density so that for a given current flow through the coil, a greater force is applied to the coil and carriage 18 than would be the case without the focussing pole pieces.

Thus it will be seen that the present invention provides an electromagnetic actuator for a disc drive that has enhanced flux density in the working gap and therefore produces more force on the coil and carriage for the same amount of current applied to the coil. Because of the greater force, access time to a given track on disc 12 is reduced. Reduction in access time is achieved by employment of relatively low cost ceramic magnets rather than more expensive Alnico or rare earth cobalt permanent magnets, which produce greater flux densities than ceramic magnets, but are substantially more expensive.

Although one embodiment of the invention has been shown and described, it will be obvious that other adaptations and modifications can be made without departing from the true spirit and scope of the invention.

What is claimed is:

1. An electromagnetic linear actuator for moving a read/write head radially of a rotating data disc comprising a head supporting carriage, said carriage having an end remote from the head that has a generally rectangular cross-sectional shape and defines a generally rectangular opening extending axially thereof, a voice coil secured to said carriage end and having a rectangular cross-sectional shape substantially coaxial of said end, means for supporting said carriage for axial movement on an axis that extends generally radially of said disc, a magnetic housing having walls defining a rectangular cavity that has an open end disposed to afford movement of said carriage and said voice coil within said cavity, said housing having a rear magnetic plate mounted to said walls in magnetic circuit therewith, said rear plate extending substantially transversely of the direction of axial movement of said carriage, a central core piece fixed to said rear plate within said cavity and extending in a direction parallel to the direction of axial movement of said carriage, said core piece having a rectangular cross-sectional shape sized to fit within said rectangular opening and said voice coil, four permanent magnets disposed in said housing, each said permanent magnet being of generally right parallelepiped shape and having an outer surface and an inner surface, means for securing the outer surfaces of said magnets to respective housing walls so that said inner surface confront the respective outer surfaces of said core piece in spaced apart relation thereto, four focussing pole pieces each having an outer face secured to an inner surface of a respective one of said permanent magnets, said focussing pole pieces having inner faces parallel to and spaced from respective said outer faces thereof, said inner faces defining with the external surfaces of said central core piece an annular, axially extending working gap sized to receive said coil and said carriage end therein, said focussing pole pieces having a trapezoidal cross-sectional shape so that the area of the inner faces thereof is less than the area of said outer faces in order that the flux density in said working gap exceeds the flux density of said permanent magnets.

2. The invention of claim 1 wherein each said focussing pole piece has two side surfaces that extend between the edge of said outer face and said inner face, said side surfaces residing at an angle of 45° to said outer faces, the side surfaces of adjacent focussing pole pieces being spaced from one another to define a gap adjacent to a corner of said working gap.

3. In an electromagnetic linear actuator of the type including a carriage having a portion that has an outer rectangular cross-sectional shape and an inner rectangular passage substantially geometrically similar to and coaxial with said outer shape, an electric coil fixed to said portion coaxially therewith, a magnetic housing having a wall defining a rectangular cavity for receiving said carriage therein, said housing including a central core piece disposed in said cavity in magnetic circuit with said housing and defining with the housing wall an annular channel for receiving said carriage and coil therein, means for supporting said carriage for axial reciprocating movement in said annular channel, and at least one permanent magnet fixed to said wall and forming a magnetic flux field with said central core piece which coacts with a flux field produced in response to current flow in said coil to apply force to said carriage axially of said annular channel, the improvement comprising a flux focussing pole piece associated with said permanent magnet, said pole piece being formed of flux transmitting magnetic material and having a first face substantially congruent to the face of the associated permanent magnet and adhesively secured thereto, said pole piece having a second face opposite from and substantially parallel to said first face, said second face confronting said central core piece to define a working gap, said second face having an area less than that of said first face so that the flux density at said second face and in said working gap exceeds the flux density at said first face and in said permanent magnet, said pole piece having edge surfaces that converge from the perimeter of said first face to the perimeter of said second face, said working gap constituting a part of said annular channel, said electric coil residing in said working gap.

4. An actuator in accordance with claim 1 wherein said focussing pole piece has a cross-sectional shape in plane transverse to the direction of axial movement of said carriage that it is trapezoidal.

5. An actuator in accordance with claim 4 wherein said trapezoidal shape has two side surfaces, said side surfaces defining an angle of substantially 45° with said first face.

* * * * *